United States Patent
Schimmelpfeng (10) Patent No.: US 8,620,908 B2
(45) Date of Patent: Dec. 31, 2013

(54) RETRIEVING CONFIGURATION RECORDS FROM A CONFIGURATION MANAGEMENT DATABASE

(75) Inventor: Jörn Schimmelpfeng, Herrenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 256 days.

(21) Appl. No.: 13/123,686

(22) PCT Filed: Oct. 15, 2008

(86) PCT No.: PCT/EP2008/063910
§ 371 (c)(1),
(2), (4) Date: Apr. 11, 2011

(87) PCT Pub. No.: WO2010/043257
PCT Pub. Date: Apr. 22, 2010

(65) Prior Publication Data
US 2011/0238658 A1 Sep. 29, 2011

(51) Int. Cl.
*G06F 17/30* (2006.01)
*G06F 7/00* (2006.01)

(52) U.S. Cl.
USPC .......................................... 707/723; 707/780

(58) Field of Classification Search
USPC ........................................................ 707/723
See application file for complete search history.

(56) References Cited

U.S. PATENT DOCUMENTS

| | | | | |
|---|---|---|---|---|
| 6,631,365 | B1 * | 10/2003 | Neal et al. | 707/690 |
| 6,871,174 | B1 * | 3/2005 | Dolan et al. | 704/9 |
| 6,915,306 | B1 * | 7/2005 | Gong et al. | 707/999.101 |
| 6,928,442 | B2 * | 8/2005 | Farber et al. | 707/999.101 |
| 7,870,151 | B2 * | 1/2011 | Mayer et al. | 707/780 |
| 2001/0032025 | A1 * | 10/2001 | Lenz et al. | 700/28 |
| 2003/0115199 | A1 * | 6/2003 | Ochiai et al. | 707/10 |
| 2006/0004875 | A1 | 1/2006 | Baron et al. | |
| 2007/0294237 | A1 | 12/2007 | John et al. | |
| 2008/0104080 | A1 * | 5/2008 | Copeland et al. | 707/10 |
| 2008/0114770 | A1 | 5/2008 | Chen et al. | |
| 2008/0183724 | A1 | 7/2008 | Mueller | |
| 2008/0189279 | A1 * | 8/2008 | Mayer et al. | 707/6 |

OTHER PUBLICATIONS

European Patent Office, International Search Report, Jun. 5, 2009, 4 pages, Rijswijk, The Netherlands.

* cited by examiner

*Primary Examiner* — Pavan Mamillapalli (57) ABSTRACT

A method is provided of retrieving a configuration record from a configuration management database pertaining to an IT-infrastructure including host devices, a configuration record having attributes and assigned attribute values, the IT-infrastructure being managed by an operation management system providing messages indicating events in the IT-infrastructure. The method includes providing a message including a set of unidentified attribute values and an identified host value, retrieving from the configuration management database one or more configuration records containing the identified host value, and selecting from the one or more retrieved configuration records a configuration record depending on the number of matches between the unidentified attribute values and the attribute values of the retrieved configuration records.

25 Claims, 9 Drawing Sheets

ALERT MESSAGE FROM THE INCIDENT MANAGEMENT SYSTEM

| MSG ID | 37849057957398 |
|---|---|
| HOST | HTTPSERVER01.HP.COM |
| SERVER TYPE | APACHE |
| PROBLEM | DOES NOT RESPOND |
| PORT | 80 |

IDENTIFIED HOST VALUE

UNIDENTIFIED

~20

ATTRIBUTES   ATTRIBUTE VALUES

CONFIGURATION RECORD IN THE CMDB

| CIID | 782937957 |
|---|---|
| HOST | HTTPSERVER01.HP.COM |
| TYPE | WEB SERVER |
| CAPTION | WEB SERVER |
| SERVER SOFTWARE | APACHE |
| PORT | 80 |

~21

SCORE VALUE: 2

| NAME | BLUESKY.MYORG.COM |
|---|---|
| TYPE | UNIX |
| HOSTED ON | BLUESKY.MYORG.COM |
| IP | 201.201.201.21 |
| VENDOR | HP |
| OS | HPUX |

2

| NAME | OPENVIEW |
|---|---|
| TYPE | ORACLEDB |
| HOSTED ON | BLUESKY.MYORG.COM |
| INSTANCE NAME | OPENVIEW |
| VENDOR | ORACLE |

3

| NAME | OPENVIEW TABLESPACE |
|---|---|
| TYPE | TABLESPACE |
| HOSTED ON | BLUESKY.MYORG.COM |
| INSTANCE | OPENVIEW |

4

| NAME | NETWORK |
|---|---|
| HOSTED ON | BLUESKY.MYORG.COM |

5

| NAME | DHCPD |
|---|---|
| HOSTED ON | BLUESKY.MYORG.COM |
| IP RANGE | 201.201.201.0/24 |

6

| LABEL | TIMEANDLABOR |
|---|---|
| NAME | TIMEANDLABOR |
| TYPE | PORTAL |
| HOSTED ON | (NULL) |
| DEPARTMENT | HR |
| URL | HTTP://TL.MYORG.COM |

```
EVENT ID: NETWORK:DHCPD@@BLUESKY.MYORG.COM
EVENT MESSAGE: PROCESS IS STOPPED
```

ATTRIBUTE VALUES: {NETWORK, DHCPD,
          BLUESKY.MYORG.COM}
            ↑
            └─HOST VALUE ⎯⎯⎯⎯⟶ MAPPED TO #4 or #5

2.

```
EVENT ID: ORACLE:DATABASE:OPENVIEW@@BLUESKY.MYORG.COM
EVENT MESSAGE: DATABASE IS NOT AVAILABLE
```

ATTRIBUTE VALUES: {ORACLE, DATABASE, OPENVIEW,
          BLUESKY.MYORG.COM}
            ↑
            └─HOST VALUE

⎯⎯⎯⎯⟶ MAPPED TO #2

3.

```
EVENT ID: ORACLE:DATABASE:OPENVIEW:TABLESPACE@@BLUESKY.MYORG.COM
EVENT MESSAGE: TABLESPACE IS FULL
```

ATTRIBUTE VALUES: {ORACLE, DATABASE, OPENVIEW, TABLESPACE,
          BLUESKY.MYORG.COM}
            ↑
            └─HOST VALUE

⎯⎯⎯⎯⟶ MAPPED TO #3

4.

```
EVENT ID: SOMESTRANGEPROCESS@@BLUESKY.MYORG.COM
EVENT MESSAGE: PROCESS IS STOPPED
```

ATTRIBUTE VALUES: {SOMESTRANGEPROCESS,
          BLUESKY.MYORG.COM}
            ↑
            └─HOST VALUE

⎯⎯⎯⎯⟶ MAPPED TO #1

5.

```
EVENT ID: TIMEANDLABOR:HR@@
EVENT MESSAGE: SERVICE DOES NOT RESPOND
```

ATTRIBUTE VALUES: {TIMEANDLABOR, HR,
          (NULL)}
            ↑
            └─HOST VALUE

⎯⎯⎯⎯⟶ MAPPED TO #6

*Fig. 4b*

| ATTRIBUTE VALUE | CONFIGURATION RECORD |
|---|---|
| BLUESKY. MYORG.COM | #1, #2, #3, #4, #5, #7, . . . |
| UNIX | #1, #8, #9, . . . |
| HP | #1, #10, #12, . . . |
| HPUX | #1, #13, #17, . . . |
| OPENVIEW | #2, #18, . . . |
| ORACLEDB | #2, #10, . . . |
| NETWORK | #4, #9, . . . |
| DHCPD | #5, #8, . . . |

Fig. 5

1. EVENT:

SCORE VALUE FOR CR#3: 3     (2 FOR HOST +
                             1 FOR HOST CR)

SCORE VALUE FOR CR#4: 4.1   (2 FOR HOST +
                             2 FOR "NETWORK" +
                             $\frac{1}{10} \cdot 1$)

SCORE VALUE FOR CR#5: 4.2   (2 FOR HOST +
                             2 FOR "DHCPD" +
                             $\frac{1}{10} \cdot 2$)

RETRIEVING CONFIGURATION RECORDS FROM A CONFIGURATION MANAGEMENT DATABASE

FIELD OF THE INVENTION

The present invention relates to information technology (IT) systems and, more, particularly, methods and apparatus for retrieving a configuration record (CR) describing a configuration item (CI) from a configuration management database (CMDB) based on an event message.

BACKGROUND OF THE INVENTION

Large and complex IT management environments that provide multiple services to a plurality of customers can create an unmanageable number of entities. A configuration management database contains data objects (configuration records) which represent an extensive range of logical and physical entities and their complex relationships. A configuration management database is a repository for information related to all the components (configuration items) of an information system. Although repositories similar to configuration management databases have been used by IT departments for many years, the term configuration management database stems from ITIL (Information Technology Infrastructure Library). In the ITIL context, a configuration management database represents the authorized configuration of the significant components of the IT environment. A key goal of a configuration management database is to help an organization understand the relationships between these components and track their configuration. The configuration management database is a fundamental component of the ITIL framework's configuration management process. An information technology infrastructure library (ITIL) is a set of guidelines for information technology (IT) service management. ITIL consists of a series of publications giving guidance on the provision of quality IT-services, and on the processes and facilities needed to support them. ITIL guidelines are considered best practice guidelines for an IT-service. Best practice is a technique, method, activity, or process that is considered more effective at providing a particular outcome than any other technique, method, activity or process. A typical implementation of a configuration management database may contain more than 800 abstract object classes, with implicit and explicit relationships between them that may be extended in an open-ended fashion.

Normally, a configuration management database is a repository which is accessed by other systems, for example, an incident management system which provides messages relating, for example, to a failure of a configuration item. Since the incident management system often uses a different identification scheme to that used by the configuration management database, it is difficult to identify a configuration record based on the information from the message. However, the information stored in the configuration management database may be crucial to remedy the failure to which the message refers. Therefore, it is desirable to obtain further information about a configuration item which is stored in the configuration management database and affected by a failure merely on the basis of information from a message although the message uses identifiers which are incompatible with the attribute names of the configuration management database.

Usually information systems use artificially generated keys (surrogate keys) to identify objects. These keys are easy to use for relationships inside a database, but are of little use outside. External systems use other artifacts to identify an object uniquely (typically called "natural keys"). But sometimes the external system does not have all the information needed to build such a natural key or does not know how to build it.

Therefore, the problem addressed by this invention is to identify an object in a configuration management database without having knowledge about its identification method/scheme.

SUMMARY OF THE INVENTION

According to one aspect of the invention, a method is provided of retrieving a configuration record from a configuration management database pertaining to an IT-infrastructure including host devices, a configuration record having attributes and assigned attribute values, the IT-infrastructure being managed by an operation management system which provides messages indicating events in the IT-infrastructure. The method includes providing a message including a set of unidentified attribute values and an identified host value, retrieving from the configuration management database one or more configuration records containing the identified host value, and selecting from the one or more retrieved configuration records a configuration record depending on the number of matches between the unidentified attribute values and the attribute values of the retrieved configuration records.

According to another aspect, a computer system is provided for retrieving a configuration record in a configuration management database pertaining to an IT-infrastructure including host devices, a configuration record having attributes and assigned attribute values, the IT-infrastructure being managed by an operation management system providing messages indicating events in the IT-infrastructure. The computer system is programmed to provide a message including a set of unidentified attribute values and an identified host value, to retrieve from the configuration management database one or more configuration records containing the identified host value, and to select from the one or more retrieved configuration records a configuration record depending on the number of matches between the unidentified attribute values and the attribute values of the retrieved configuration records.

According to yet another aspect, a computer program product is provided which is either in the form of a machine-readable medium with program code stored on it, or in the form of a propagated signal including a representation of program code. The program code is arranged to carry out a method, when executed on a computer system, of retrieving a configuration record from a configuration management database pertaining to an IT-infrastructure including host devices, a configuration record having attributes and assigned attribute values, the IT-infrastructure being managed by an operation management system providing messages indicating events in the IT-infrastructure. The method includes providing a message including a set of unidentified attribute values and an identified host value, retrieving from the configuration management database one or more configuration records containing the identified host value, and selecting from the one or more retrieved configuration records a configuration record depending on the number of matches between the unidentified attribute values and the attribute values of the retrieved configuration records.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

The drawings and the description of the drawings are of embodiments of the invention and not of the invention itself.

DESCRIPTION OF THE PREFERRED EMBODIMENTS

Figure 1:
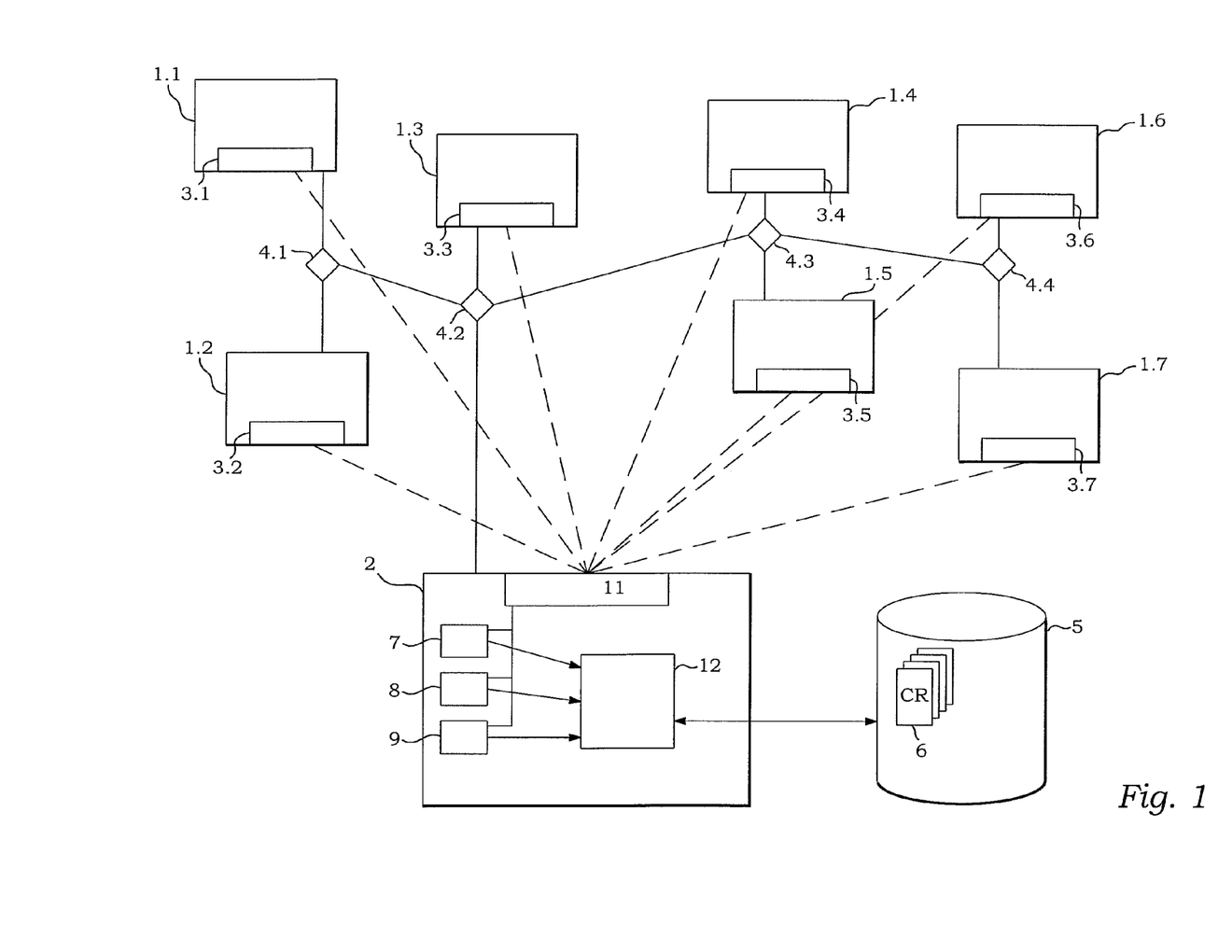
FIG. 1 shows an IT-infrastructure which includes an operation management server having a mapper for retrieving a configuration record based on an event message, according to embodiments of the invention.

FIG. 1 shows an IT-infrastructure which is managed by an operation management server 2 which includes a mapper 12 for retrieving configuration records from a configuration management database 5 based on information from messages relating to events in the IT-infrastructure. However, before proceeding with the description of FIG. 1 a few items of the embodiments will be discussed.

Some of the embodiments refer to a method of retrieving a configuration record from a configuration management database pertaining to an IT-infrastructure including host devices, a configuration record having attributes and assigned attribute values, the IT-infrastructure being managed by an operation management system providing messages indicating events in the IT-infrastructure. The method includes providing a message including a set of unidentified attribute values and an identified host value, retrieving in the configuration management database one or more configuration records containing the identified host value, and selecting from the one or more retrieved configuration records a configuration record depending on the number of matches between the unidentified attribute values and the attribute values of the retrieved configuration records.

On the one hand, an "IT-infrastructure" is the physical hardware used to interconnect computers (hosts) and users. Infrastructure includes the transmission media, including telephone lines, cable television lines, and satellites and antennas, and also the routers, switches, repeaters, and other devices that control transmission paths. On the other hand, an IT-infrastructure also includes the software used to send, receive, and manage the signals that are transmitted. An IT-infrastructure often includes an operation management system which is a server with specific software that manages components of the IT-infrastructure, so that they can be used for running application programs on it. The operation management system provides information concerning the state of individual components of the IT-infrastructure and of the IT-infrastructure as a whole. In some of the embodiments, the operation management system uses a management protocol, typically SNMP (Simple Network Management Protocol), to get information from managed hosts and other managed devices. SNMP exposes management data in the form of variables on the managed hosts, which describe the system configuration. These variables can then be queried (and sometimes set) by the operation management system.

In computer networking, a "network host" or "host" is a computer connected to an IT-network. A network host can host information as well as client and/or server software. Every Internet host has a unique IP-address, including a host address part. The host address is assigned either manually by the computer administrator, or automatically at start-up by means of the Dynamic Host Configuration Protocol (DHCP). Every host is a network node (i.e. a network device), but every node is not a host. For example, network nodes such as modems and network switches are not assigned host addresses, and are not considered to be hosts. However, in this document, an interconnect device having an IP-address is also considered to be a host. Devices such as network printers and hardware routers are assigned IP host addresses, but since they are not general-purpose computers, they are sometimes not considered to be hosts in the literature. However, in the context of this document, these devices are considered to be hosts, too.

In some of the embodiments, a host is a virtual host. Virtual hosting is a method that servers such as webservers use to host more than one domain name on the same computer, sometimes on the same IP address. There are two basic methods of accomplishing virtual hosting: name-based, and IP address or IP-based. Name-based virtual hosts use multiple host names for the same webserver IP address. For instance, a server could be receiving requests for two domains, www.site1.com and www.site2.com, both of which resolve to the same IP address. In IP-based virtual hosting, each site (either a DNS hostname or a group of DNS hostnames that act the same) points to a unique IP address. The webserver is configured with multiple physical network interfaces, virtual network interfaces on the same physical interface or multiple IP addresses on one interface. The webserver can obtain the address the TCP connection was intended for using a standard API and uses this to determine which website to serve. The client is not involved in this process and therefore (unlike with name based virtual hosting) there are no compatibility issues.

In some of the embodiments, a (network) service is considered to be a configuration item to be managed in a configuration management database in the form of a configuration. A service does not necessarily run on one host. In this case, a virtual host would be helpful on which the service runs. In other embodiments, a dummy host could be included that is used if no host is associated with a configuration item. Also in these cases, it is checked whether the host value from the message is contained in the configuration records. But in this case, it is the dummy host value.

A service is the foundation of a networked computing environment. Generally a network service is installed on one or more servers to provide shared resources to client computers. Network services are configured on corporate LAN's to ensure security and user friendly operation. They help the LAN run smoothly and efficiently. Corporate LANs use network services such as DNS (Domain Name System) to give names to IP and MAC addresses (people remember names like "bluesky.myorg.com" better than they remember numbers like "201.201.201.0.18"), and DHCP to ensure that everyone on the network has a valid IP address.

DHCP eases administrative burden by automating the IP assignment of nodes on the network. Adding or removing nodes from the network does not create problems with IP address retrieval; the DHCP service handles this automatically. Authentication servers are another network service, they allow every user to have their own account, and everything they do on that account is logged under their user name. This means that not only are users accountable for anything they do while on the network, but also it increases security as anyone wanting to access the LAN must have a registered user name and password.

Doing network administration without having user accounts to track user activity (illegal or otherwise) or DHCP to automate IP assignment to nodes, or DNS to simplify IP address access would be troublesome indeed. Enabling these few network services automates complex and time consuming administration to the network, and thus eases downtime for network administrators.

Common network services include: authentication servers, directory services, Dynamic Host Configuration Protocol (DHCP), DNS, e-mail, printing and Network file system.

However, the term "service" may also be understood in the more abstract meaning of an "IT-service" which is often used in a business contest. An IT-service is a facility or process that satisfies some demand of a business, which has some reliance upon an IT-infrastructure. These IT-services are usually made up of multiple layers of technology, for example networks, operating systems, system hardware, databases and mission critical applications. IT-service monitoring continually assesses the availability and performance of an IT-service at all levels, from an end to end perspective, through and including each technological component.

A "managed host" is a host whose operating system and application are monitored and updated by an operation management system.

Configuration management is the process responsible for maintaining information about configuration items required to deliver an IT-service, including their relationships. The primary objective of configuration management is to underpin the delivery of IT-services by providing accurate data to all IT-service management processes when and where it is needed.

Configuration management manages information about configuration items throughout the lifecycle of a configuration item. A configuration item is any component that needs to be managed in order to deliver an IT-service. In some of the embodiments, a configuration item is a host, a disk drive, monitor, keyboard, printing device, mouse, scanner, a process, a service, an e-mail-server, an employee, a building or a manual. Information about each configuration item is stored in a configuration record within a configuration management database. A configuration record is a data set containing the detailed information about a configuration item in the form of attribute values assigned to attributes. In other words, a configuration record is the textual description of a configuration item which is a physical (router, disk drive, etc.) or logical entity (process, software, etc.). Each configuration record documents the lifecycle of a single configuration item. Configuration records are stored in a configuration management database.

A "configuration management database" is a database used to manage configuration records throughout the lifecycle of the configuration item assigned with the configuration record. The configuration management database stores the attributes and their assigned values of the configuration items, and relationships between the configuration items. The configuration management database is maintained by configuration management and is used by all IT-service management processes.

An "identified attribute value" is an attribute value whose semantics is known, whereas an unidentified attribute value is an attribute value whose semantics is unknown. In other words, the "unidentified attribute value" is simply a string of characters, but its meaning is either entirely unknown to the operation management system or its semantics is known within the operation management system but not with regard to the attributes of the configuration records in the remote configuration management database. This may occur for example since the configuration management database uses different attribute names to the attribute names from the messages, so that although they mean the same, the operation management system cannot map them due to the different nomenclature. In other words, the identification scheme of the incident management system is different from the identification scheme of the configuration management database.

The term "identified host value" denotes any information concerning a host, in particular a name, such as "bluesky.myorg.com", or a number or any other identifier identifying a host. The operation management system is aware that this is the name of a host and not, for example, the name of any other configuration item, such as a disk drive, router, etc. In the embodiments, the identified host value is a so-called "must-attribute". That means that the host value of the message must be identical to the host value of the configuration record in order to be considered as a potential targeted configuration record.

The term "retrieving" as used herein has the meaning of locating and reading data from a storage/database. It does neither necessarily refer to displaying the data on a monitor nor to transmitting the data.

It should be mentioned that, by definition, the term "match" is only used for correspondences between unidentified attribute values and attributes values from a configuration database, not however for the correspondences of the host-values since the host-values are "must-attributes". In some of the embodiments of the invention, the identified host value is in contrast to the unidentified attribute value in that the unidentified attribute values are "can-attributes" which means that a search is conducted among the attributes to find a match, but a match does not necessarily have to be found in order for a configuration record to be selected. The more matches between the can-attributes, the better the configuration record matches with the attribute values from the message, i.e. with the message itself. That means that there is a high chance that the configuration record selected pertains to a configuration item to which the message refers, which is, for example, affected by a failure. The additional information provided in the configuration record may help an operator to remedy the failure. Some of the embodiments of the invention refer to a service and a procedure to solve the problem of a remote object identification. The embodiments of the invention are used to translate message information from an (operational) operation management system so that a configuration record (from a configuration management database) describing a configuration item to which the message relates may be queried. Since the configuration management database and the operation management system have completely different ways of identifying a configuration item, this is non-trivial.

In some of the embodiments of the invention, fuzzy key information is translated into a surrogate key of a remote data source (here: configuration management database) so that a configuration record can easily be retrieved. (The word "fuzzy" is not used here in the specific sense of "fuzzy logic", but in the more general sense of "vague"). Additionally, some of the embodiments of the invention are able to rank retrieved configuration records and thereby indicate how well a configuration record meets the given key information.

In some of the embodiments, attribute values of a configuration record in the configuration management database are compared with attribute values provided by an incoming message from an incident management system (which is part of the operation management system).

When, for example, incident management system provides a message, that a failure has occurred in one of the configuration items of the IT-infrastructure, it is often desirable to automatically get more detailed information about the configuration item affected. In principle, such detailed information is available in the system's configuration management database, but the problem is the incompatibility of the data structure of the message with the data structure of the configuration records storing information about the configuration items. Usually, a configuration management database is organized according to an entity-relationship data model according to which an entity has a set of attributes to which attribute values are assigned and the entities are connected by defined relationships. Since the incident management system and the configuration management database have completely different ways of describing the same configuration items (e.g. they use different attribute names for the same configuration items), a mapping functionality has to be provided to be able to retrieve configuration records from the configuration management database which correspond to the configuration items referred to in the message.

In some of the embodiments, all the attribute values of a configuration record in the configuration management database are compared to all the attribute values provided by an incoming message. Since this is a rather time-consuming operation, in other embodiments, a special index structure is provided in advance (preprocessing) to quickly select configuration records that contain specific attribute values from the message. In some of the embodiments, this special index structure is a hash table which gets an attribute value as an input and outputs the set of configuration records having this attribute value. In computer science, a hash table, or a hash map, is a data structure that associates keys with values, here attribute values. The primary operation it supports efficiently is a lookup: given a key (here an attribute value), find the corresponding configuration record containing the attribute value. It works by transforming the key using a hash function into a hash, a number that is used as an index in an array to locate the desired location where the values should be. The number is normally converted into the index by taking a modulo, or sometimes bit masking is used where the array size is a power of two.

In other embodiments, a scoring function is provided which ranks all the configuration records and thereby indicates how well they match to a given message.

In some of the embodiments, an incident management system (for example a monitoring system) is part of the operation management server and includes agents which are located on host devices and send information concerning the state of the host and its configuration items to the operation management system. The agents communicate with the operation management system via a management protocol, such as SNMP (Simple Network Management Protocol).

In some of the embodiments, the number of matches between a retrieved configuration record and a message is determined by permuting the unidentified attribute values and comparing each permutation with the attribute values of the retrieved configuration records, and the number of matches relates to a permutation with the most identities. Abstractedly speaking, for example, the unidentified attributes values of a message are {A, C, D} and the attribute values of one of the retrieved configuration records are {A, B, C}, the following permutations are:
 a) A-A, B-C, C-D=>1 match
 b) A-A, B-D, C-C=>2 matches
 c) A-C, B-A, C-D=>0 matches
 d) A-C, B-D, C-A=>0 matches
 e) A-D, B-A, C-C=>1 match
 f) A-D, B-C, C-A=>0 matches For this configuration record, the number of matches is 2 since in case b) A and C could have been matched. The same procedure is performed for the other retrieved configuration records (=the configuration records having the same host value). Finally, the configuration record with the highest score value is returned.

In some of the embodiments, the operation management system includes one or more of the following subsystems: an incident management system, a service level management system, an asset management system, and a discovery system and wherein a message indicating an event may pertain to any of the subsystems and is related to the state of the system.

In some of the embodiments, the unidentified attribute values and the identified host value are extracted from a message. This may be performed by string-matching procedures which are e.g. based on regular expressions.

In some of the embodiments, the score values indicate the number of matches.

In other embodiments, a more specialized configuration record obtains higher score values, and a measure for specialization is the distance of a configuration record from its parent within a containment hierarchy in the configuration management database. The containment hierarchy in a configuration management database represents which configuration items are logically contained in another configuration item.

In some of the embodiments, a score values is obtained by adding the number of matches and one tenth of the distance to the parent item, up to a maximum value of 0.9. That means that a distance of ten or more from a parent record only contributes to the score value as a value of 0.9.

Some of the embodiments refer to a fallback-solution, if no matches are found. In these cases, the configuration record of the host is returned. The fallback-solution will be explained below in FIG. 4b and FIG. 6.

In other embodiments, selecting configuration records is performed using hash tables.

In some of the embodiments, agents run on the hosts to provide information about the state of the hosts to the operation management system.

In other embodiments, the configuration management database and the configuration items are in compliance with the ITIL. The Information Technology Infrastructure Library (ITIL) is a set of concepts and techniques for managing information technology (IT) infrastructure, development, and operations. ITIL is published in a series of books, each of which cover an IT management topic. ITIL gives a detailed description of a number of important IT practices with comprehensive checklists, tasks and procedures that can be tailored to any IT organization.

Some of the embodiments of the computer program product with program code for performing the described methods include any machine-readable medium that is capable of storing or encoding the program code. The term "machine-readable medium" shall accordingly be taken to include, for example, solid state memories and, removable and non-removable, optical and magnetic storage media. In other embodiments, the computer program product is in the form of a propagated signal including a representation of the program code, which is increasingly becoming the usual way to distribute software. The signal is, for example, carried on an electromagnetic wave, e.g. transmitted over a copper cable or through the air, or a light wave transmitted through an optical fiber. The program code may be machine code or another code which can be converted into machine code, such as source code in a multi-purpose programming language, e.g. C, C++, Java, C#, etc. The embodiments of a computer system may be commercially available general-purpose computers programmed with the program code.

FIG. 1: Managed IT-Infrastructure with Configuration Management Database

Returning now to FIG. 1, which illustrates an IT-infrastructure including seven host devices (1.1-1.7), an operation management server 2 and a configuration management database 5 containing configuration records (CR) 6 which describe configuration items of the IT-infrastructure. The host devices 1 are interconnected by interconnect devices (4.1-4.4) such as routers, switches, hubs, etc. to provide an IT-network. (In this example, the interconnect devices 4 are not considered to be hosts, but in other examples they could be considered to be hosts, especially if they have an IP-address.) The operation management server 2 is also part of the IT-network and manages the host devices 1. To this end, a discovery application 11 is provided which obtains information from agents (3.1-3.7) residing on the hosts 1. The discovery application 11 and the agents 3 communicate via SNMP (Simple Network Management Protocol). The Simple Network Management Protocol forms part of the internet protocol suite and is used in network management systems to monitor network-attached devices for conditions that warrant administrative attention. It consists of a set of standards for network management, including an Application Layer protocol, a database schema, and a set of data objects. SNMP exposes management data in the form of variables on the managed systems, which describe the system configuration. These variables can then be queried (and sometimes set) by managing applications.

The operation management server 2 further includes some management subsystems/applications such as an incident management system 7. An incident is any event which is not part of the standard operation of a service and which causes, or may cause, an interruption to, or a reduction in, the quality of that service. The stated ITIL objective is to restore normal operations as quickly as possible with the least possible impact on either the business or the user, at a cost-effective price. The first goal of an incident management system 7 is to restore a normal service operation as quickly as possible and to minimize the impact on business operations, thus ensuring that the best possible levels of service quality and availability are maintained. "Normal service operation" is defined here as service operation within a service level agreement (SLA).

Further, a service level management system 8 is provided which monitors compliance with a service level agreement. A service level agreement is a formally negotiated agreement between two parties. It is a contract that exists between customers and their service provider, or between service providers. It records the common understanding about services, priorities, responsibilities, guarantee, and such—collectively, the level of service. For example, it may specify the levels of availability, serviceability, performance, operation, or other attributes of the service like billing and even penalties in the case of violation of the service level agreement. A message coming from the service level management system 8 may refer to the event that a service level agreement is likely to be violated unless any specific host is not put into operation again.

Finally, an asset management system 9 is provided. IT Asset Management is the discipline of managing finances, contracts and usage of IT assets throughout their lifecycles for the purpose of maintaining an optimal balance between business service requirements, total costs, budget predictability, and contractual and regulatory compliance. Traditional asset management activities include the management of inventory, software licenses, vendors, procurement, leases, warranties, cost accounting, retirement and disposal.

The incident management system 7, service level management system 8 and the asset management system 9 all depend on data delivered by the discovery application 11 which is, for example, able to derive—at least partly—the topology of the IT-network based on information from the management information bases residing on the managed hosts 1.

These four typical management systems are further connected to a mapper 12 which provides the functionality of retrieving configuration records 6 in the configuration management database that match well with a message provided, i.e. which contain data concerning a configuration item affected by the event referred to by the message.

Figure 2:
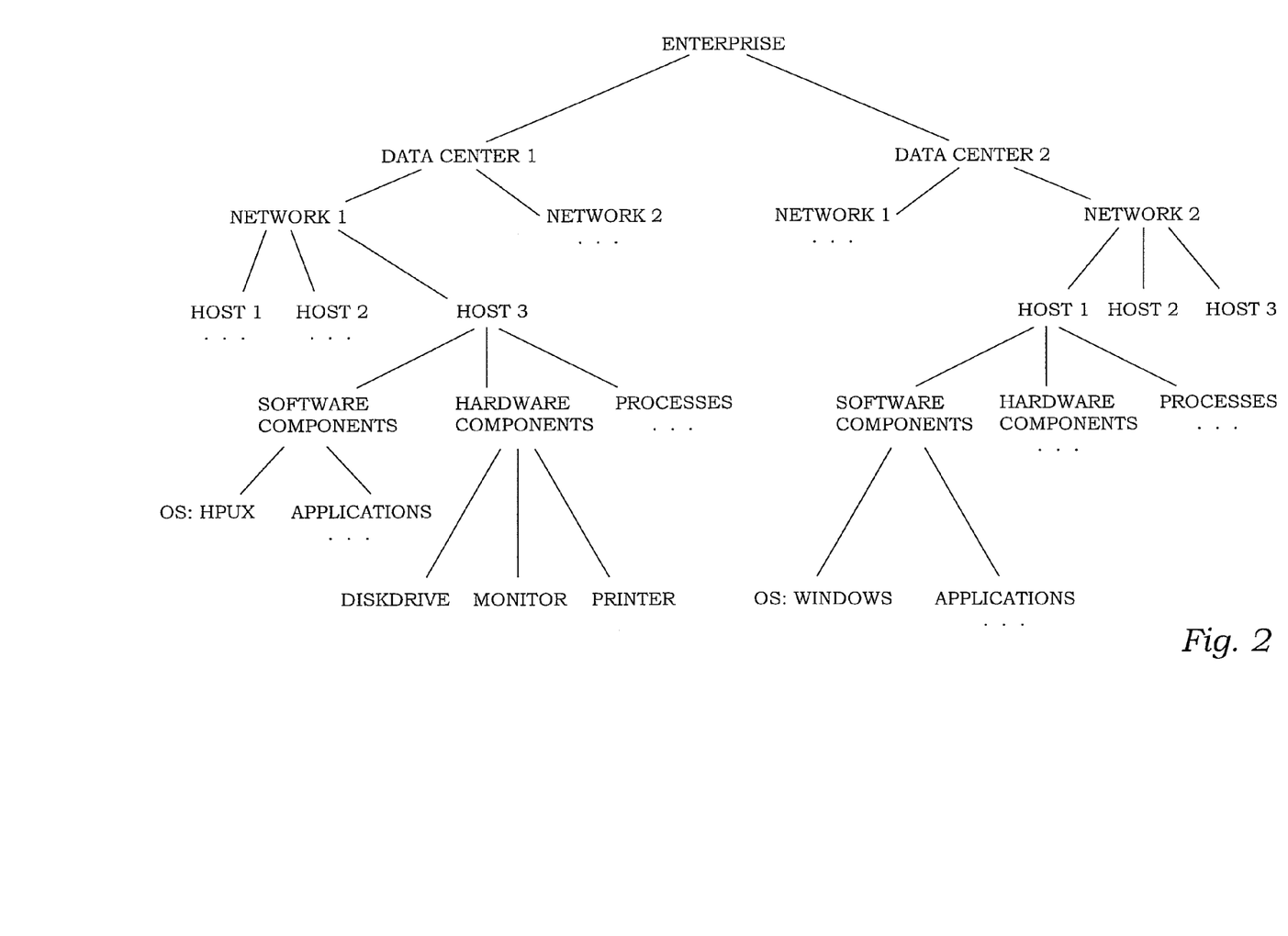
FIG. 2 schematically illustrates configuration items in an enterprise, according to embodiments of the invention.

FIG. 2: Tree-Structure of Configuration Records within a Configuration Management Database FIG. 2 schematically illustrates configuration items in an enterprise according to one embodiment of the invention. Since the number of configuration items that the enterprise wants to manage may be extremely large and complex, only an extract of the entire structure is shown. The configuration item "enterprise" includes two "data centers" each of which is made up of several networks. An IT-network includes host devices and interconnect devices. A host device, in turn, contains software components, hardware components and processes. In the example, a software component is an operating system, applications, such as a word-processing program. A hardware component is a disk drive, monitor, printing device etc. The illustration shows a tree structure which is typical of a configuration management database pertaining to an enterprise.

Figure 3:
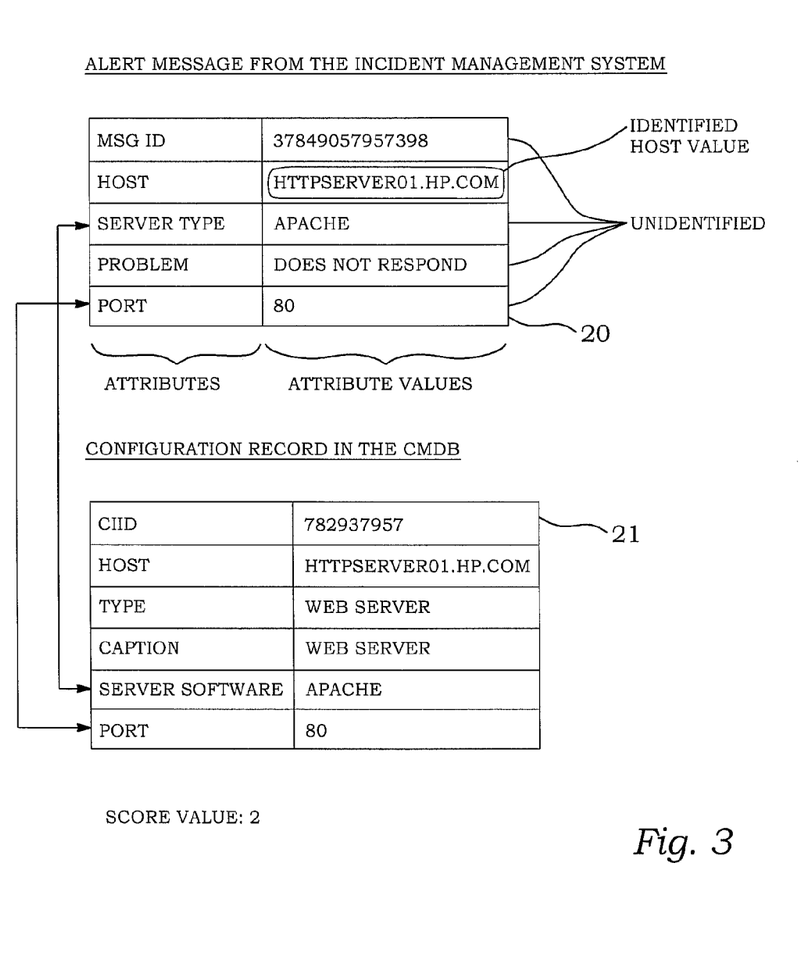
FIG. 3 shows an alert message from an incident management system, a configuration record in the configuration management database and a score value indicating the number of matches between the message and the record, according to embodiments of the invention.

FIG. 3: Calculating a Score Value for a Configuration Record and an Alert Message FIG. 3 shows in its upper part an alert message 20 coming from the incident management system 7 which detected that an Apache server (configuration item) does not respond anymore. It is now useful to get further information about the Apache server to be able to remedy the problem.

The configuration record 21 in the lower part of FIG. 3 relates to this server and can be identified by the configuration item ID "782937957". However, this configuration item ID is not known to the incident management system 7, which generates a message based on the information from the agents, and is therefore of no use. Although the message has attribute values assigned to the attributes, the configuration management database 5 is unable to interpret them since the attributes of the alert message 20 are in a format which is different from the format of the configuration records of the configuration management database 5. For example, the attribute "Server- Type" of the alert message 20 denotes the same as "Server-Software" of the configuration record. However, since different attribute names are used, the incident management server 2 is unable to find the configuration record in the configuration management database 5 which is related to the server (configuration item) that does not respond anymore. Nevertheless, it is possible to identify the configuration record by further comparing the attribute values "ServerType" and "Host". If it is assumed that there could be only one Apache instance per host, this would already uniquely identify the configuration record of the Apache server. Otherwise the additional Port information will be sufficient to query the related configuration record. However, it is necessary to define so-called "must-attributes" which must match. The invention is based on recognizing that in the case of configuration management databases "Host" is such a must-attribute, because there may be multiple instances of a configuration item but only one per host. This is typical of IT-networks, so that host is an ideal attribute for a must-attribute for IT-networks. Therefore, the only attribute of the alert message which is known to the mapper 12 is the host value "httpserver01.hp.com". The mapper 12 is able to identify this attribute value. In the configuration management database 5, the mapper 12 searches for all configurations records containing the same host value. The mapper 12 finds, for example, the configuration record 21 since it has the same host value "httpserver01.hp.com". Then the mapper 12 compares the unidentified attribute values of the alert message 20 with the attribute values of the configuration record 21. This may be done by permuting all unidentified attribute values of the alert message 20 and comparing each permutation with the attribute values of the configuration record 21 or, more efficiently, by means of a special index structure. Thereby, it can be determined that "Port=80" of the alert message 20 matches with "Port=80" of the configuration record 21. In this case, the attribute name is coincidentally the same, but this is not necessary, since the mapping procedure works independently of the attribute names. Another match is found between "ServerType=Apache" of the alert message 20 and "ServerSoftware=Apache" of the configuration record 21 since both have the same attribute value "Apache". It is therefore assumed that ServerSoftware and ServerType are two attributes denoting the same, i.e. have the same semantics. But it is not important which attributes match with each other. In this example, two matches have been found. Therefore, the configuration item 21 gets a score value of 2. Now, further configuration items all having the host value "httpserver01.hp.com" are examined and a score value is calculated for each of them. All together, this leads to a scoring function that defines how well a configuration record matches to a given set of attribute values. In the example, the function is simply the number of attribute values that matches to a specific configuration record. The more attributes match the better. The configuration record with the highest score will be elected as the targeted configuration record. A score value indicates how well a configuration record matches to a given set of attribute values. Even though this approach does not always guarantee a correct match, it matches a configuration record with a very high probability.

Figure 4A:
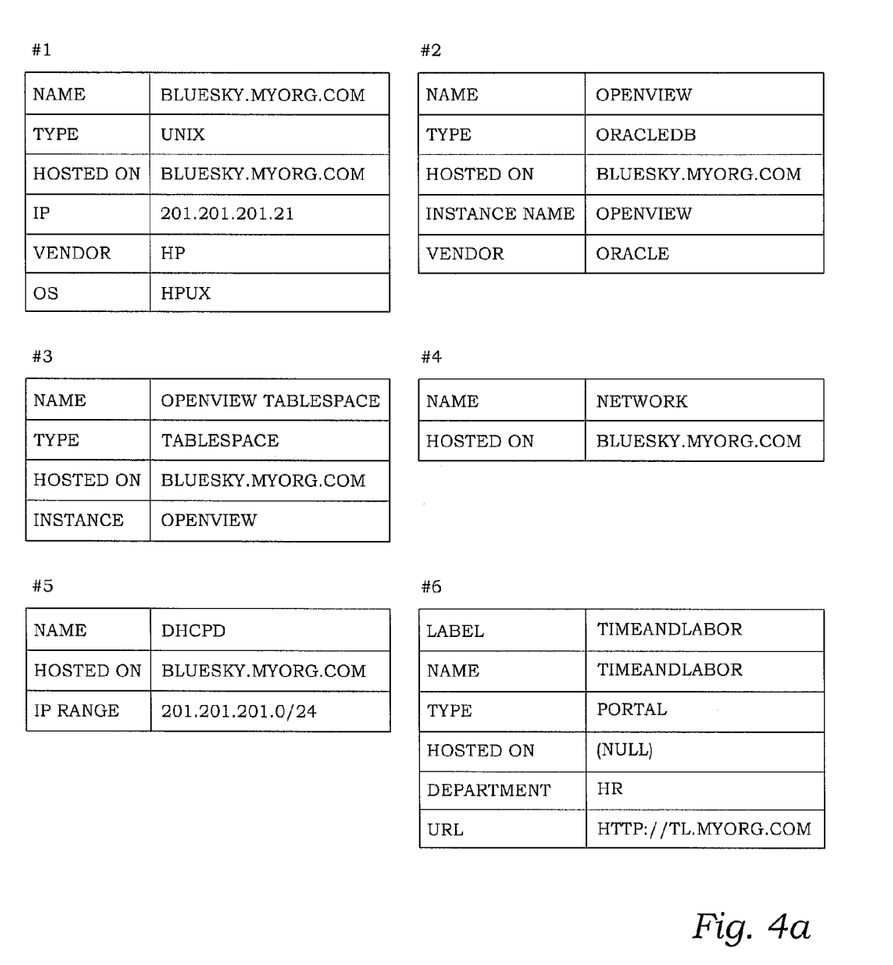
FIG. 4a illustrates six configuration records from the configuration management database, according to embodiments of the invention.
Figure 4B:
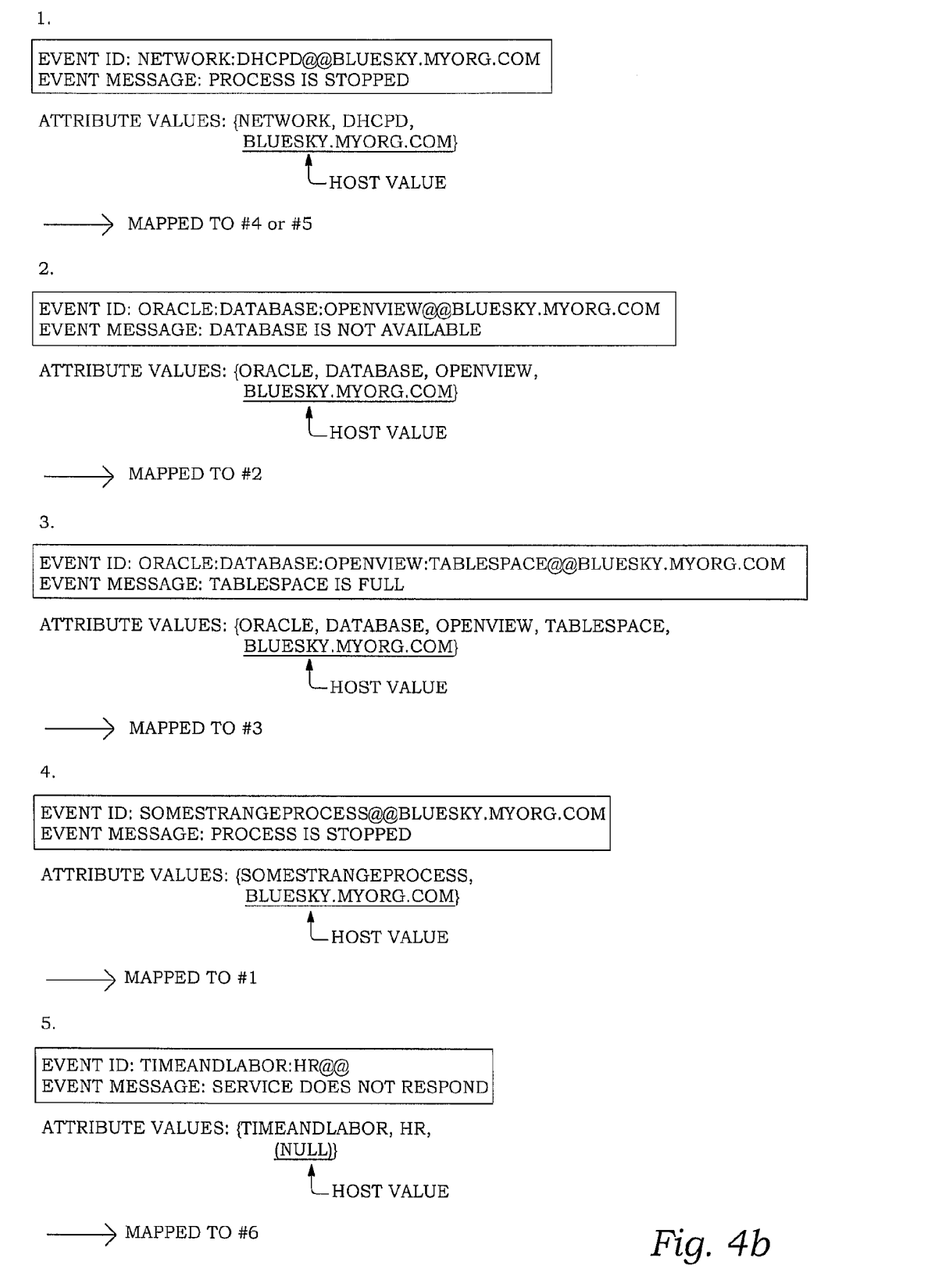
FIG. 4b illustrates five event messages coming from an incident management system which are to be mapped onto the configuration records of FIG. 4a, according to embodiments of the invention.

FIG. 4: Matches Between Configuration Records and Event Messages

On the one hand, FIG. 4a illustrates six different configuration records (#1-#6) each having different attributes. Configuration records #1-#5 have "bluesky.myorg.com" as host value (host name) and configuration record #6 has "(NULL)" as host value. These host values are recognized as such by the mapper 12 by means of the attribute "Hosted On".

FIG. 4b, on the other hand, illustrates five different event messages (1-5) which are to be mapped to the configuration records of FIG. 4a. In this example, each match is awarded by a score value of 1. First, the attribute values (keywords) are extracted from the event messages. The attribute values are keywords relating to the event.

The attribute values of the first message are {Network, DHCPD, bluesky.myorg.com}, whereby "bluesky.myorg.com" is the host value (must-attribute) and is therefore an identified attribute value. In this example, the host value is identified by means of the characters "@@" since the host value always follows behind these characters. The host value may therefore be extracted by means of regular expressions. The attribute values "Network" and "DHCPD" are unidentified attribute values since the mapper 12 does a priori not know whether there is a corresponding attribute in the configuration records 6 of the configuration management database 5, and if there is one, what its name is. The first event message will be mapped to configuration record #4 or #5. Both configuration records get a score value of 1 since configuration record #4 has one match ("Network") and configuration record #5 also has one match ("DHCPD").

The second event message contains the attribute values {Oracle, Database, OpenView, bluesky.myorg.com}. In the configuration management database 5, all configuration records 6 are retrieved which contain the host value "bluesky.myorg.com" which is the case for configuration records #1-#5. For all of these configuration records 6 the number of matches is determined. A scoring function determines a score value of 0 for the configuration record #1 since no attribute values (except the host value) is matched. For the configuration record #2, a score value of 2 is determined. A score value of 1 is calculated for the configuration record #3 since only the attribute value "OpenView" is matched. Configuration record #4 gets a score value of 0. Configuration record #5 also gets a score value of 0. Finally, the second event message is mapped to configuration record #2.

The third event message contains the attribute values {Oracle, Database, OpenView, Tablespace, bluesky.myorg.com}. When compared to the configuration record #1, zero matches are found, while when comparing the attribute values to the attribute values of the configuration record #2, two matches are found. A comparison to configuration #3 also results in two matches, whereas a comparison to configuration record #4, #5 and #6 results in zero matches. A further refinement of the scoring function allows for resolving the conflict (same number of matches) between the configuration record #2 and the configuration record #3.

The fourth event message contains the attribute value {SomeStrangeProcess}. No matches can be found with regard to any of the configuration records #1-#5. If there is no real good match for a configuration record, it could still be fine to select a related configuration record as a fallback. In this example, it has been defined that the host that is related to a configuration record is returned as the targeted configuration record. Normally, it is still better to relate a message to the host than to no one.

The fifth event message contains the attribute values {TimeAndLabor, HR}, whereas (NULL) is considered to be the host value. The only configuration record having this host value is configuration record #6, so that the fifth event message is mapped to the configuration record #6. No matches need to be determined since only one configuration record has been determined.

Thus, the mapper 12 tries to conclude from the available information (=attribute values of the message), which configuration record in the configuration management database might fit best. The basic idea behind that is to compare the attribute values of the messages with the attribute values of the configuration records.

Figure 5:
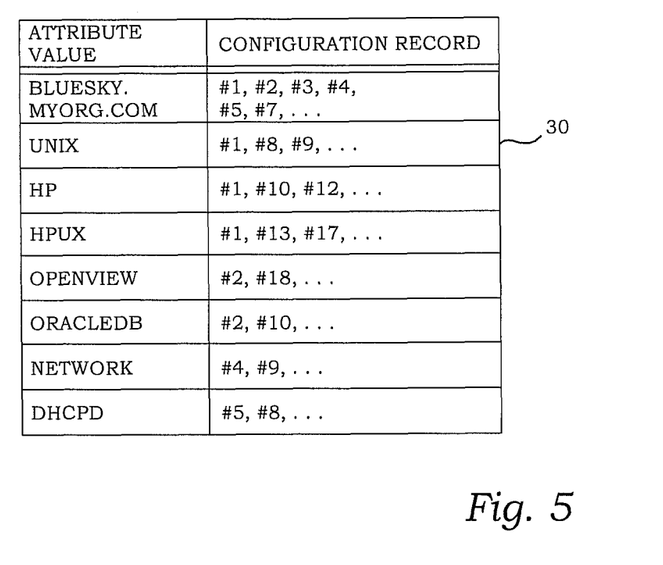
FIG. 5 illustrates an index structure for finding configuration records having a certain attribute value, according to embodiments of the invention.

FIG. 5: Index Structure

FIG. 5 relates to an index structure 30 which helps to find the matches efficiently. For each attribute value, all configuration records 6 of the configuration management database 5 are listed which contain the corresponding attribute value. When a message is received, the attribute values are extracted and the index structure is used to find the corresponding configuration records. Looking at the second event message of FIG. 4b, the attribute values "bluesky.myorg.com" (must-attribute) and "OpenView", "Oracledb" all point to configuration record #2, so that this configuration record obtains a score value of 4 (2 for the host value, 1 for "OpenView" and 1 for "Oracledb") which is a higher score value than for the rest of the configuration records. Therefore, configuration record #2 is returned as the configuration record which matches best with the second event message of FIG. 4b.

Figure 6:
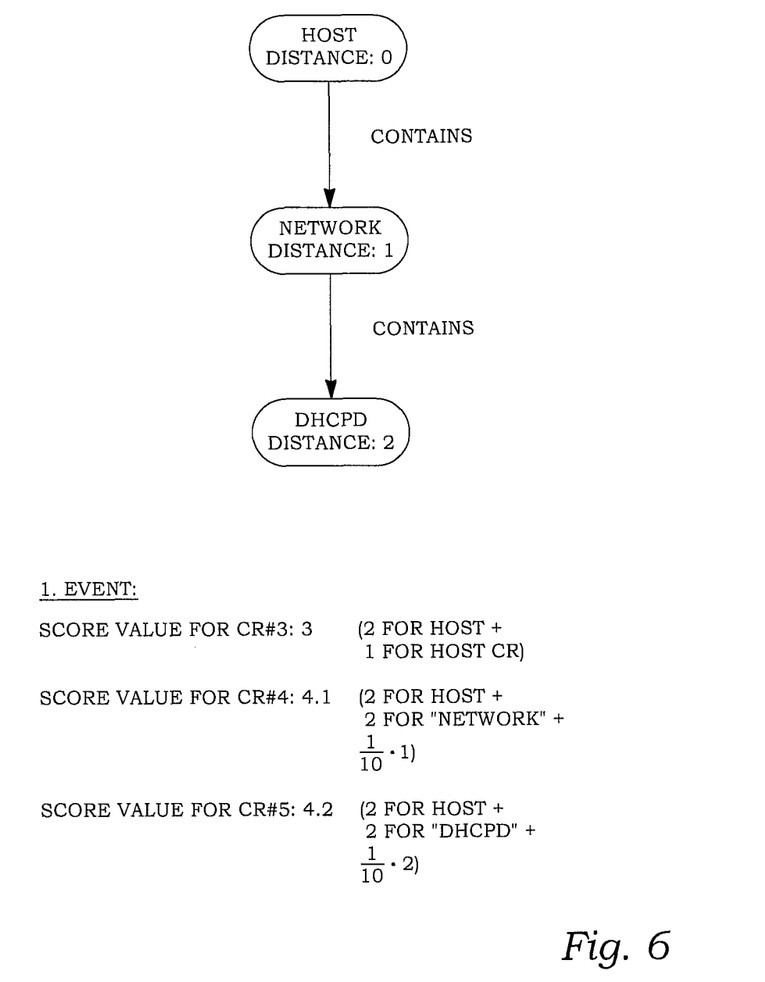
FIG. 6 shows a refined scoring function based on a distance metric, according to embodiments of the invention.

FIG. 6: Refined Scoring Function

FIG. 6 refers to a refined scoring function which resolves configuration records having the same number of matches. Examination of the first event message of FIG. 4b and configuration record #3 of FIG. 4a reveals that a score value of 2 is obtained since both have the same host value "bluesky.myorg.com". A further score value of 1 is added since configuration record #3 is the record of the host. By adding a value of 1, the fallback solution described above is obtained. If among all configuration records retrieved (i.e. the host value is the same) no further attributes match, all have a score value of 2. Hence, a value of 1 is added so that the configuration record of the host gets a score value of 3 and is therefore returned as the configuration record which matches best. Comparing the configuration record #4 with the first event message results in a score value of 2 for the host value plus 2 for the "Network" attribute value. Furthermore, the distance between the host and the "Network" according to the containment-relationship is taken into account. In this example, the distance is 1, so that a distance value of 0.1 is added to the score value of 4, which results in an overall score value of 4.1. Regarding the configuration record #5, which has a distance of two from the host, 0.2 is added to the score value of 4, so that the overall score value for configuration record #5 is 4.2. This refined scoring function enables a distinction to be made between configuration records having the same number of matches in that a configuration record which is farther away from the host record receives a higher score value. However, there is a limit for the distance values since the maximum distance value added is 0.9. If the distance between the host record and the configuration record to be scored is for example 12, a distance value of 0.9 is added to the score value although one would expect a value of 1.2 to be added.

Figure 7:
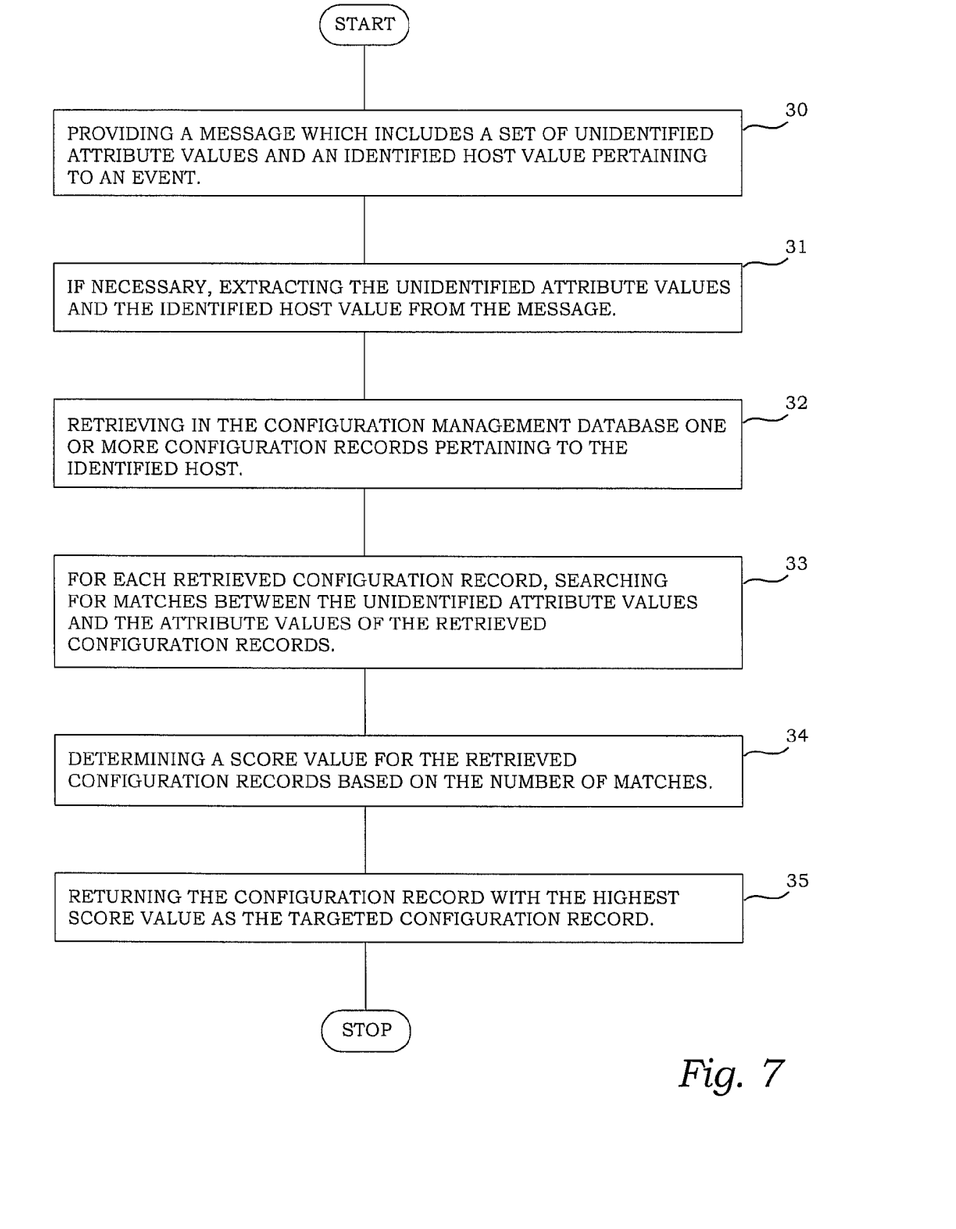
FIG. 7 is a flowchart illustrating retrieving configuration records from a configuration management database according to embodiments of the invention.

FIG. 7: Flowchart Illustrating the Retrieving of Configuration Records

FIG. 7 is flowchart illustrating retrieving configuration records 6 in the configuration management database 5. At 30, a message which includes a set of unidentified attribute values and an identified host value pertaining to an event is provided. At 31, the unidentified attribute values and the identified host values are extracted from the message. At 32, one or more configuration records pertaining to the identified host are retrieved in the configuration management database. At 33, for each retrieved configuration record, a search is performed to find matches between the unidentified attribute values and the attribute values of the retrieved configuration records. At 34, a score value is determined for the retrieved configuration records based on the number of matches. At 35, the configuration record with the highest score value is returned as the targeted record.

Figure 8:
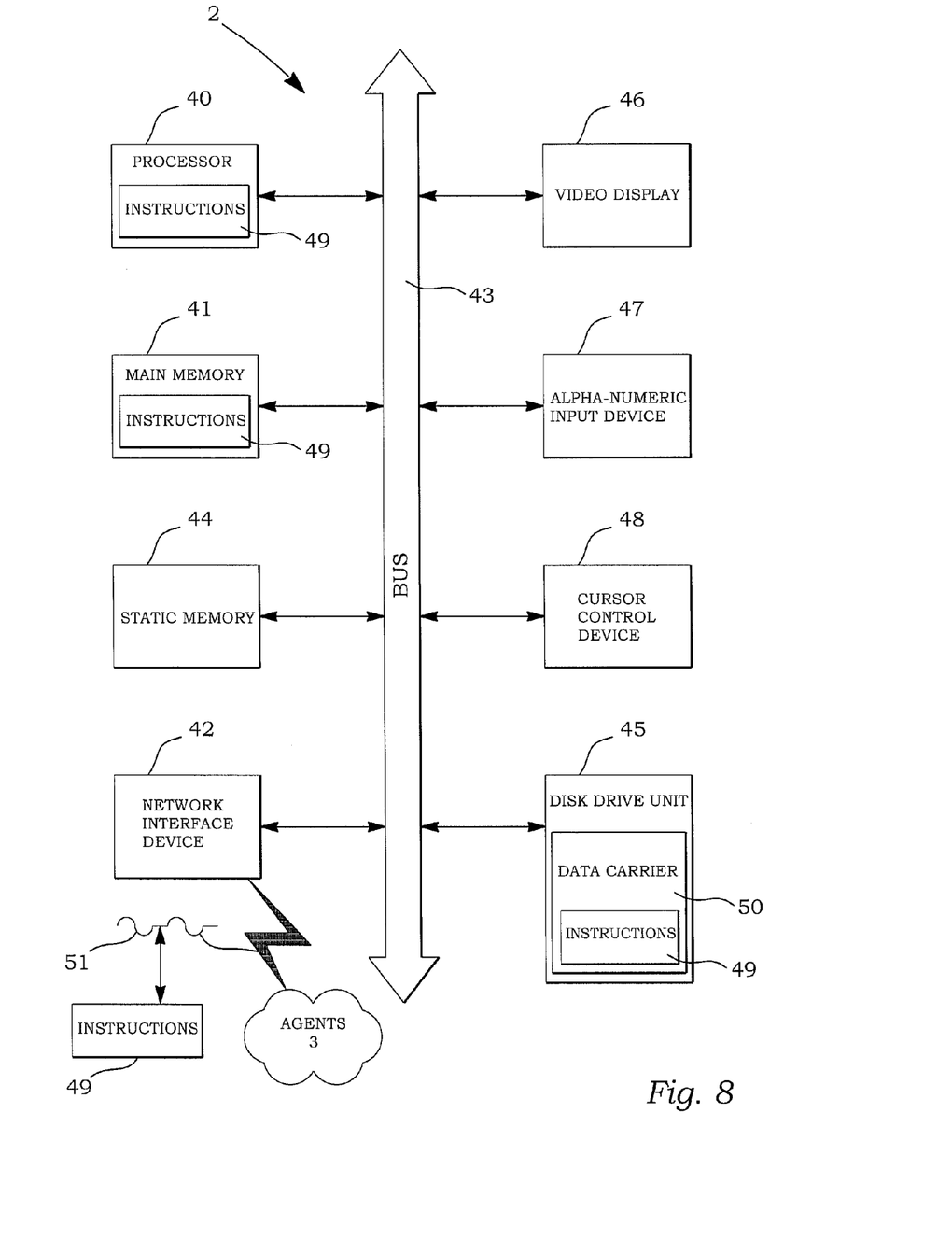
FIG. 8 is a diagrammatic representation of an embodiment of an operation management station.

FIG. 8: Diagrammatic Representation of a Computer System

FIG. 8 is a diagrammatic representation of a computer system which provides the functionality of the operation management server 2 including the mapper 12 and is therefore denoted as "operation management computer system 2". Within the operation management computer system 2 a set of instructions 49, for causing the computer system to perform any of the methodologies discussed herein, may be executed. The operation management computer system includes a processor 40, a main memory 41 and a network interface device 42, which communicate with each other via a bus 43. Optionally, it may further include a static memory 44 and a disk drive unit 45. A video display 46, an alpha-numeric input device 47 and a cursor control device 48 may form an operation management user interface. The network interface device 42 connects the operation management computer system 2 to the agents 3 residing on hosts of the managed IT-infrastructure. A set of instructions 49 (i.e. software) embodying any one, or all, of the methodologies described above, resides completely, or at least partially, in or on a machine-readable medium, e.g. the main memory 41 and/or the processor 40. A machine-readable medium on which the software resides 49 may also be a data carrier 50 (e.g. a non-removable magnetic hard disk or an optical or magnetic removable disk) which is part of disk drive unit 45. The software 49 may further be transmitted or received as a propagated signal 51 via the Internet and the IT network through the network interface device 42.

Thus, the embodiments of the invention described above allow the mapping of messages to a configuration record in a configuration management database even though both are using incompatible identification schemes or when there is only little information in the message that can be used to lookup data in the configuration management database. In other words, a precise mapping (in at least 90% of the cases) of message information to a configuration record may be obtained without a detailed knowledge about a configuration management database, especially without knowledge about its logical structure. The invention allows the integration of a system to be carried out with minimal changes to existing systems.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally of under the doctrine of equivalents.

The invention claimed is:

1. A method of retrieving a configuration record in a configuration management database pertaining to an IT-infrastructure comprising host devices, a configuration record having attributes and assigned attribute values, the IT-infrastructure being managed by an operation management system providing messages indicating events in the IT-infrastructure, the method comprising:

provinding a message comprising a set of unidentified attribute values and an identified host value, retrieving from the configuration management database one or more configuration records containing the identified host value, and selecting from the one or more retrieved configuration records a configuration record depending on the number of matches between the unidentified attribute values and the attribute values of the retrieved configuration records, wherein each of the unidentified attribute values includes an attribute value whose semantics are unknown.

2. The method of claim 1, wherein the operation management system comprises one or more of the following subsystems: an incident management system, a service level management system, an asset management system, and a discovery system and wherein a message indicating an event may pertain to any of the subsystems and is related to the state of the system.

3. The method of claim 1, further comprising determining score values for the retrieved configuration records based on the number of matches.

4. The method of claim 1, further comprising extracting the unidentified attribute values and the identified host value from the message.

5. The method of claim 1, wherein the number of matches between a retrieved configuration record and a message is determined by permuting the unidentified attribute values and comparing each permutation with the attribute values of the retrieved configuration records, and the number of matches relates to a permutation with the most identities.

6. The method of claim 3, wherein the score values indicate the number of matches.

7. The method of claim 3, wherein a more specialized configuration record obtains higher score values, and a measure for specialization is the distance of a configuration record from its parent record within a containment hierarchy in the configuration management database.

8. The method of claim 3, wherein the score values are obtained by adding the number of matches and one tenth of the distance to the parent record, up to a maximum value of 0.9.

9. The method of claim 3, wherein, if no matches are found, the configuration record of the host is returned.

10. The method of claim 1, wherein a configuration item is a host, a disk drive, monitor, keyboard, printing device, mouse, scanner, a process, a service, an e-mail-server, an employee, a building or a manual.

11. The method of claim 1, wherein selecting configuration records is performed using hash tables.

12. The method of claim 1, wherein agents run on the hosts to provide information about the state of the hosts to the operation management system.

13. A computer system for retrieving a configuration record from a configuration management database pertaining to an IT-infrastructure comprising host devices, a configuration record having attributes and assigned attribute values, the IT-infrastructure being managed by an operation management system providing messages indicating events in the IT-infrastructure, the computer system being programmed to:
provide a message comprising a set of unidentified attribute values and an identified host value,
retrieve from the configuration management database one or more configuration records containing the identified host value, and
select from the one or more retrieved configuration records a configuration record depending on the number of matches between the unidentified attribute values and the attribute values of the retrieved configuration records, wherein each of the unidentified attribute values includes an attribute value whose semantics are unknown.

14. A non-transitory machine-readable medium storing program instructions executable by a processor to:
retrieve a configuration record from a configuration management database pertaining to an IT-infrastructure comprising host devices, a configuration record having attributes and assigned attribute values, the IT-infrastructure being managed by an operation management system providing messages indicating events in the IT-infrastructure;
provide a message comprising a set of unidentified attribute values and an identified host value,
retrieve from the configuration management database one or more configuration records containing the identified host value, and
select from the one or more retrieved configuration records a configuration record depending on the number of matches between the unidentified attribute values and the attribute values of the retrieved configuration records, wherein each of the unidentified attribute values includes an attribute value whose semantics are unknown.

15. The medium of claim 14, wherein the operation management system comprises one or more of the following subsystems: an incident management system, a service level management system, an asset management system, and a discovery system and wherein a message indicating an event may pertain to any of the subsystems and is related to the state of the system.

16. The medium of claim 14, including instructions executable by the processor to determine score values for the retrieved configuration records based on the number of matches.

17. The medium of claim 14, including instructions executable by a processor to extract the unidentified attribute values and the identified host value from the message.

18. The medium of claim 16, including instructions executable by a processor to determine the number of matches between a retrieved configuration record and a message by permuting the unidentified attribute values and comparing each permutation with the attribute values of the retrieved configuration records, and the number of matches relates to a permutation with the most identities.

19. The medium of claim 16, wherein the score values indicate the number of matches.

20. The medium of claim 16, wherein a more specialized configuration record obtains higher score values, and a measure for specialization is the distance of a configuration record from its parent record within a containment hierarchy in the configuration management database.

21. The medium of claim 16, including instructions executable by a processor to add the number of matches and one tenth of the distance to the parent record, up to a maximum value of 0.9, to obtain the score values.

22. The medium of claim 16, instructions executable by a processor to return the configuration record of the host if no matches are found.

23. The medium of claim 14, wherein a configuration item is a host, a disk drive, monitor, keyboard, printing device, mouse, scanner, a process, a service, an e-mail-server, an employee, a building or a manual.

24. The medium of claim 14, including instructions executable by a processor to select configuration records using hash tables.

25. The medium of claim 14, wherein agents run on the hosts to provide information about the state of the hosts to the operation management system.

* * * * *